March 1, 1960 S. YANDO 2,927,152

COLOR TELEVISION BEAM REGISTRATION SYSTEM

Filed Aug. 25, 1955 4 Sheets-Sheet 1

INVENTOR
STEPHEN YANDO
BY Theodore Jay Jr.
ATTORNEY

March 1, 1960 S. YANDO 2,927,152

COLOR TELEVISION BEAM REGISTRATION SYSTEM

Filed Aug. 25, 1955 4 Sheets-Sheet 2

INVENTOR
STEPHEN YANDO

BY [signature]

ATTORNEY

March 1, 1960 S. YANDO 2,927,152

COLOR TELEVISION BEAM REGISTRATION SYSTEM

Filed Aug. 25, 1955 4 Sheets-Sheet 3

INVENTOR
STEPHEN YANDO
BY Theodore Jayk
ATTORNEY

INVENTOR
STEPHEN YANDO
BY Theodore Jay Jr.
ATTORNEY

United States Patent Office 2,927,152

Patented Mar. 1, 1960

2,927,152

COLOR TELEVISION BEAM REGISTRATION SYSTEM

Stephen Yando, Huntington, N.Y., assignor, by mesne assignments, to Sylvania Electric Products Inc., Wilmington, Del., a corporation of Delaware Application August 25, 1955, Serial No. 530,509

4 Claims. (Cl. 178—5.4)

My invention is directed toward television receivers and cathode ray tube registration systems for use therein.

One type of cathode ray tube adapted for use in color television receivers is provided with an image forming screen having a plurality of parallel stripes, usually vertical stripes, of luminescent material. These stripes are normally arranged in laterally displaced color triplets, each triplet being composed of three phosphor stripes which respond to electron irradiation to produce light of the different primary colors. The stripes are normally scanned horizontally by an electron beam which is intensity modulated in accordance with an incoming demodulated video signal carrying three signal components, each one representing one of the primary colors. These components are amplitude modulated and are displaced in phase. In order to obtain accurate color rendition, at the instant the beam strikes any particular color stripe, it must be intensity modulated by the corresponding color signal component and no other. This action can be accomplished quite readily through sequentially sampling each color component in turn, if the scanning velocity is held constant. However, the scanning velocity is normally not constant, due in part to non-linearities in the beam deflection circuits, and, for example, non-uniformities in the color triplet distribution on the screen surface. Consequently, the simple arrangement described above is not practicable; the sampling and scanning operations would not be synchronized and the color rendition would be unacceptable.

It has been proposed to place a plurality of indexing stripes at equidistantly spaced intervals on the screen. These indexing stripes may coincide with a particular color stripe in each triplet, or can be immediately adjacent each triplet; however, these stripes are composed of a material having secondary emission properties which differ from the secondary emissive properties of the color stripes. Thus, when a horizontal raster is scanned, the resultant secondary emission from the indexing stripes provides a source of indexing signals which are pulse-like in nature and which are indicative of the instantaneous position of the electron beam upon the screen. These signals can then be used to control the beam scanning circuits in such manner that the velocity of scan is held constant.

This proposed arrangement suffers from a number of serious disadvantages. In the first place, the horizontal deflection generator necessarily provided in the horizontal scanning circuit must be extremely complex, expensive and inefficient. Moreover, even the best horizontal deflection generator of this type permit some variations in the scanning velocity and, as a result, the color rendition is impaired. Moreover, the corrective action initiated by the indexing signal is relatively slow, being subject to inherent frequency dependent delays in signal transmission, and when the scanning velocity is varied at a rapid rate, the corrective action is delayed in the manner indicated, and again the color rendition is impaired.

Accordingly, it is an object of the present invention to improve the color rendition properties of color television receiver systems.

Another object is to provide a new and improved cathode ray tube system adapted for color image display and characterized by the absence of errors in color rendition.

Still another object is to provide a new and improved color television receiver system utilizing a cathode ray tube of the character indicated wherein the rate of sampling the incoming color components is controlled in accordance with the inherent variations in scanning velocity.

Yet another object is to improve the color rendition properties of color television receiver systems utilizing a cathode ray tube characterized by inherent variation in scanning velocity by controlling the rate of sampling the incoming color components in accordance with these variations, said control being affected through the use of variable time delay networks.

These and other objects of the invention will either be explained or will become apparent hereinafter.

In my invention, the indexing signals are used to control the rate at which the color signal components are sampled, and, as the scanning velocity varies, the sampling rate is likewise varied in synchronism therewith. As a result, color rendition errors no longer present a problem.

The indexing signals are not supplied directly to the apparatus (the sampler) in which the sampling operation is initiated; if this approach were to be used, the inherent frequency sensitive delays in the indexing signal transmission path would introduce phase errors which result in intolerable errors in color rendition.

Instead, the indexing signals produced as any one line is scanned in the cathode ray tube are retained within a variable time delay network as, for example, stored in proper time relation within the network or propagated within the network at a rate insufficiently high to permit complete signal passage through the network during the line scanning interval; these retained signals are then used to control the sampling operation during the interval in which next succeeding line is scanned. Stated differently, the rate of color sampling for any one line is controlled in accordance with the pattern of scanning velocity variation established by the immediately preceding line. Since there is essentially no difference between the patterns of scanning velocity variations for any two adjacent lines (due to the extremely high degree of line to line stability of any conventional scanning circuit), this approach results in unimpaired color rendition.

The scanning operation, as is conventional, is initiated by the arrival of a horizontal line synchronization pulse. Each synchronizing pulse must travel through a delay line before being supplied to the scanning circuits. Further, each synchronizing pulse, undelayed, is supplied to the variable time delay network to cause the retained indexing signals to be supplied to the sampler. The time delay introduced by the delay line is adjusted to be equal to the delay required to complete the indexing signal retaining operation so that the scanning operation for one line is properly synchronized with the sampling rate determined by the pattern of scanning velocity variation established by the immediately preceding line.

Consequently, each synchronizing pulse initiates both the scanning and the sampling operations in time synchronism; and any shift or noise jitter in the synchronizing pulse time position cannot destroy this synchronism.

Illustrative embodiments of my invention will now be described with reference to the accompanying drawings wherein.

Figure 1:
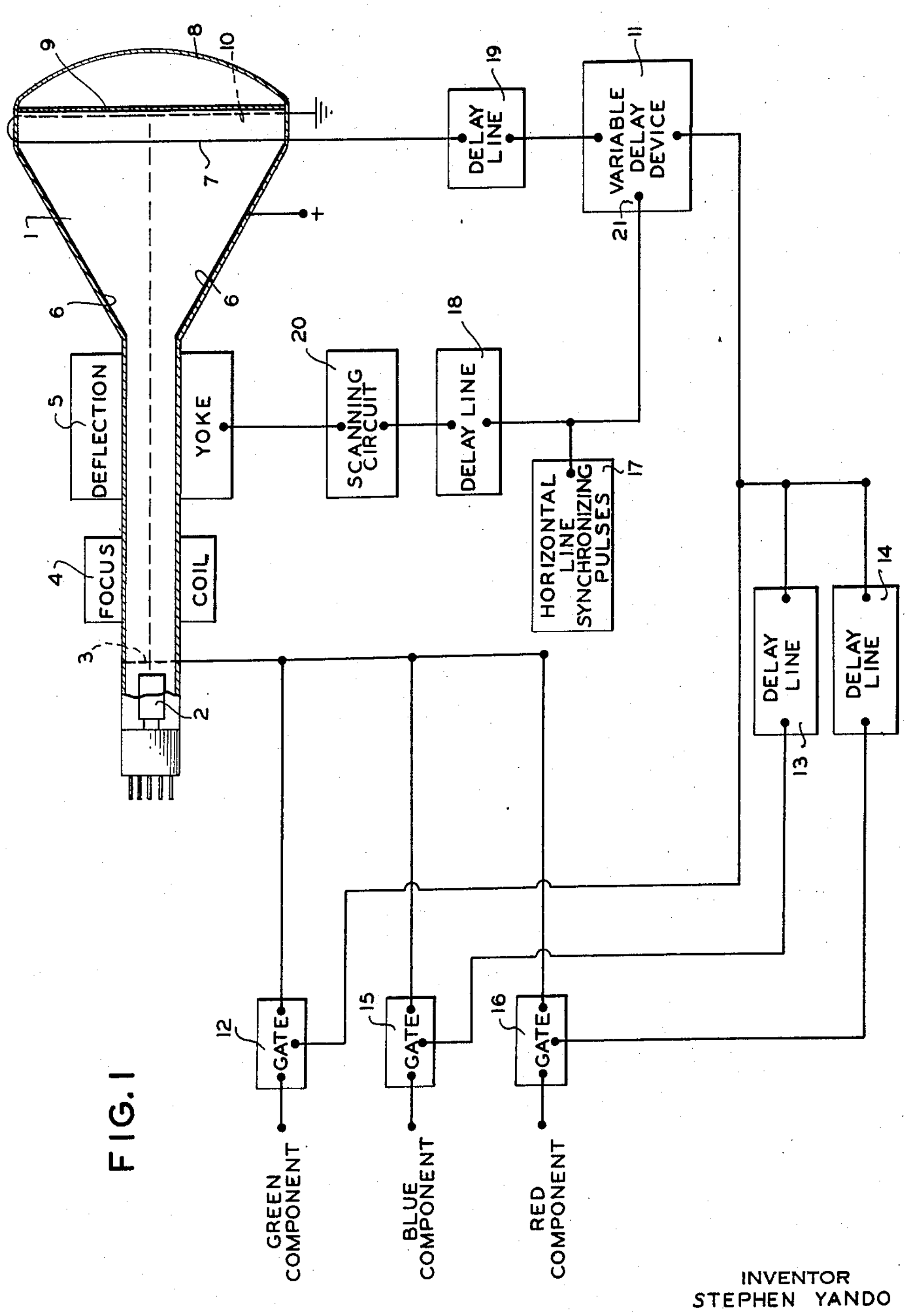
Fig. 1 is a simplified block diagram of one embodiment of my invention.

Referring now to Fig. 1, there is provided a conventional cathode ray tube identified generally at 1 and provided with an electron gun assembly 2 for producing an electron beam, a control grid 3 for said beam, a beam focus coil 4, and a beam deflection yoke 5. Deflection yoke 5 is connected to conventional beam scanning circuits (shown in block form at 20) which exhibit an inherent variation in scanning velocity, for example, on the order of ±5% about the nominal scanning velocity.

The inner wall of the cone portion of tube 1 is coated with a conductive coating 6 connection in conventional manner to a point of high positive potential. This coating terminates at a region spaced from the face plate 8. Face plate 8 is provided with an image forming screen 9. Screen 9 includes a plurality of laterally displaced color triplets, each triplet being composed of three different phosphor stripes which, when irradiated by the electron beam, fluoresce to produce light of the three primary colors, for example, red, green and blue respectively. These stripes are covered with a layer of aluminum or similar material. Arranged over each green stripe is an indexing stripe consisting of material having a secondary emission characteristic detectably different from the material of the aluminized layer. (This tube is of known type and is described in detail, for example, in U.S. Patent 2,673,890. Further details on the tube and screen will be found therein.)

Interposed between the coating 6 and the face plate 8 in the inner wall of the tube is a signal pick-off loop 7 consisting, for example, of a ring-shaped conducting coating or a coil loop inductively coupled to the tube. The output terminal 10 of the loop is coupled through a delay line 19 to a variable time delay device 11. The output of device 11 is directly connected to the conditioning electrode of gate 12, and is also connected through delay line 13 and delay line 14 to the conditioning electrodes of gates 15 and 16 respectively. The output of all three gates are connected in common to the control grid 3 of tube 1. These gates are normally closed.

Three separate received signals respectively indicative of the green, blue and red components of a televised scene, produced in conventional manner, are supplied to the inputs of gates 12, 15 and 16 respectively. These signals are then sampled in predetermined order in the manner described in more detail below to form, at the common output of all the gates, a single signal whose amplitude successively is proportional to intensity of each of the three components. This signal is supplied to the control grid of the tube 1 to control the beam intensity.

Horizontal line synchronizing pulses appear at terminal 17 and are supplied through delay line 18 to the scanning circuit 20 to initiate each horizontal scanning operation. These pulses are also supplied to a control input 20 of network 11. These synchronizing pulses are produced in known manner, and, therefore, the circuitry for producing these pulses is not described here.

When the signal for gates 12, 15 and 16 is supplied to the control grid of tube 1 and a horizontal synchronizing pulse is supplied to the scanning circuits, a horizontal scanning operation is initiated. The electron beam then impinges successively on the aluminized coating and the indexing stripes of the screen 9, thus producing indexing pulses or signals which are induced in the pick off loop 7. (Of course, the color image is produced on the screen at the same time.) These indexing signals are fed through delay line 19 to device 11 and are retained in proper time relation therein, so that, at the end of any horizontal line scanning operation, all indexing signals produced during this operation remain in device 11. Upon the arrival of any horizontal synchronizing pulse, these signals are released or read out of device 11 at this same time relation and are supplied to gates 12, 15 and 16.

Each time an indexing signal is supplied to these gates, gate 12 opens immediately for the interval in which the signal is present; after suitable delay introduced by line 13, gate 15 opens for a second like interval, and after an additional delay introduced by line 14, gate 16 opens for a third like interval. Only one gate is opened at a time.

Thus, as the electron beam traverses a green stripe, an indexing signal opens gate 12 and the green color component is supplied to the tube. Delay lines 13 and 14 delay the opening of gates 15 and 16 until the beam traverses the next adjacent blue stripe and red stripe respectively.

As indicated previously, a horizontal synchronizing pulse which identifies the start of one horizontal line, through action of delay line 18, is supplied to the scanning circuits to initiate a horizontal scanning operation in synchronism with the color sampling operation initiated by the indexing signals stored in device 11.

Since there is essentially no difference between the patterns of scanning velocity variations for any two adjacent lines, the rate of color sampling is controlled and synchronized with the scanning velocity variations in the manner previously indicated and accurate color rendition is obtained.

It will be apparent that the indexing signals produced during any scanning operation are read in and released or read out of network 11 under the control of the synchronizing pulses. Stated differently, the horizontal synchronizing pulse initiates one scanning operation and thus initiates the read in operation, while at the same time, this pulse initiates the read out operation. Hence, any variation or noise jitter in the synchronizing pulses can have no adverse effect; the scanning and sampling operations must remain in synchronism regardless of such variation or jitter.

When said jitter exists, the time delay between adjacent scanning operations can vary somewhat and as a result, the retention time for the indexing signals can likewise vary. Hence, device 11 functions as a variable time delay network, for the indexing signals traveling therethrough are delayed for a fixed period equal to somewhat less than one line interval and can be delayed for an additional variable interval (which is quite small as compared to the line interval) which is a function of whatever synchronizing pulse jitter or similar effect is present.

Figure 2:
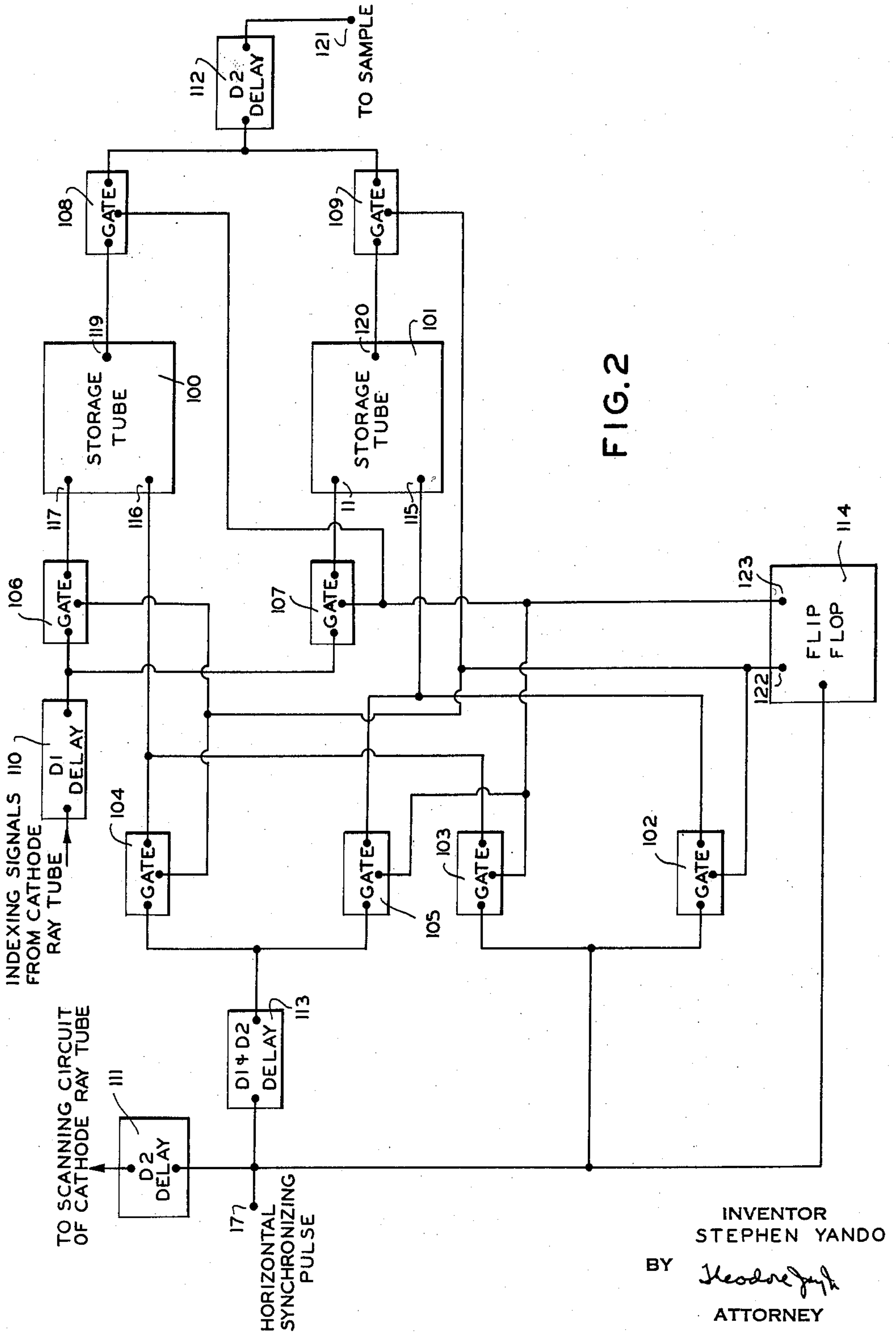
Fig. 2 is a diagram of one type of variable time delay network suitable for use in my invention.

One type of variable time delay network which functions in this manner is shown in Fig. 2. It comprises two storage tubes 100 and 101, eight gates 102, 103, 104, 105, 106, 107, 108 and 109, one D1 delay line 110, two D2 delay lines 111 and 112, one $(D1+D2)$ delay line 113, and a bi-stable multivibrator or flip-flop 114.

Incoming horizontal synchronization pulses appear at terminal 17 and are supplied through D2 delay line 111 to the scanning circuit of the cathode ray tube. These pulses are also supplied directly to the inputs of gates 102 and 103 and are supplied through the $(D1+D2)$ delay line 113 to the inputs of gates 104 and 105. The outputs of gates 102 and 105 are coupled to the scan control input 115 of storage tube 101. The outputs of gates 103 and 104 are coupled to the scan control input 116 of storage tube 100.

The indexing signals produced at the cathode ray tube (not shown in Fig. 2) are supplied through D1 delay line 110 to the inputs of gates 106 and 107. The outputs of gates 106 and 107 are respectively coupled to the writing inputs 117 and 118 of tubes 100 and 101 respectively.

The read out outputs 119 and 120 of tubes 100 and 101 are coupled to the inputs of gates 108 and 109 respectively. The outputs of these gates are coupled together through D2 delay line 112 to terminal 121. Terminal 121 is connected to the sampler (not shown in Fig. 2).

The conditioning electrodes of gates 102, 104, 106, and 109 are coupled to an output 122 of flip-flop 114. The conditioning electrodes of gates 103, 105, 107, and 108 are coupled to the second output 123 of this flip-flop. Horizontal synchronizing pulses are supplied to the input of the flip-flop; under the influence of successive pulses, the flip-flop is urged into one or the other of its two mutually exclusive states.

For example, when the first pulse is received, the flip-flop 114 attains one state, and gates 102, 104, 106, and 109 are opened while gates 103, 105, 107 and 108 are closed. When the next pulse is received this operation is reversed.

Storage tubes 100 and 101 are of a conventional type well known to the art, and are not described in detail here. Further details, for example, can be found in June 1955, RCA Review, pp. 197–215, "The Radechon," or can also be found in U.S. Patent 2,579,269. This patent shows storage tubes with individual writing input electrodes and read out electrodes and a separate scan control or sweep circuit coupled to deflection plates of the storage tubes. Since my invention is not concerned with the storage tube and scan control circuitry per se, I have shown each tube and associated scan control circuitry in the form of an overall block diagram. These two tubes act together, the stored indexing pulses previously produced during one line scanning operation being read out of one tube while the next adjacent line is being scanned and the indexing pulses thus produced are being stored in the other tube.

The network shown in Fig. 2 operates in the following fashion. A horizontal synchronizing pulse appears at terminal 17′ and is supplied with D2 delay to the scanning circuits of the cathode ray tube. This pulse also is supplied to the flip-flop and as a result for example, gates 102, 104, 106, and 109 are opened while gates 103, 105, 107 and 108 are closed.

The gating action is sufficiently rapid so that at least a major portion of this pulse passes without delay through gate 102 to initiate the read out operation of tube 102. The indexing signals previously stored in tube 102 therefore are read out and pass through gate 109 and arrive with D2 delay at the sampler. Consequently, the scanning action of the cathode ray tube and the color sampling action are synchronized in the manner previously indicated.

The same horizontal synchronization pulse previously referred to passes with $D1+D2$ delay through gate 104 to initiate the writing or storage operation of tube 100. The indexing signals produced during the cathode ray tube scanning operation pass with D1 delay through gate 106 and are stored in tube 100.

Upon the arrival of the next horizontal synchronizing pulse, the gate switching action is reversed and tube 100 is read out while tube 101 provides indexing signal storage.

Figure 3:
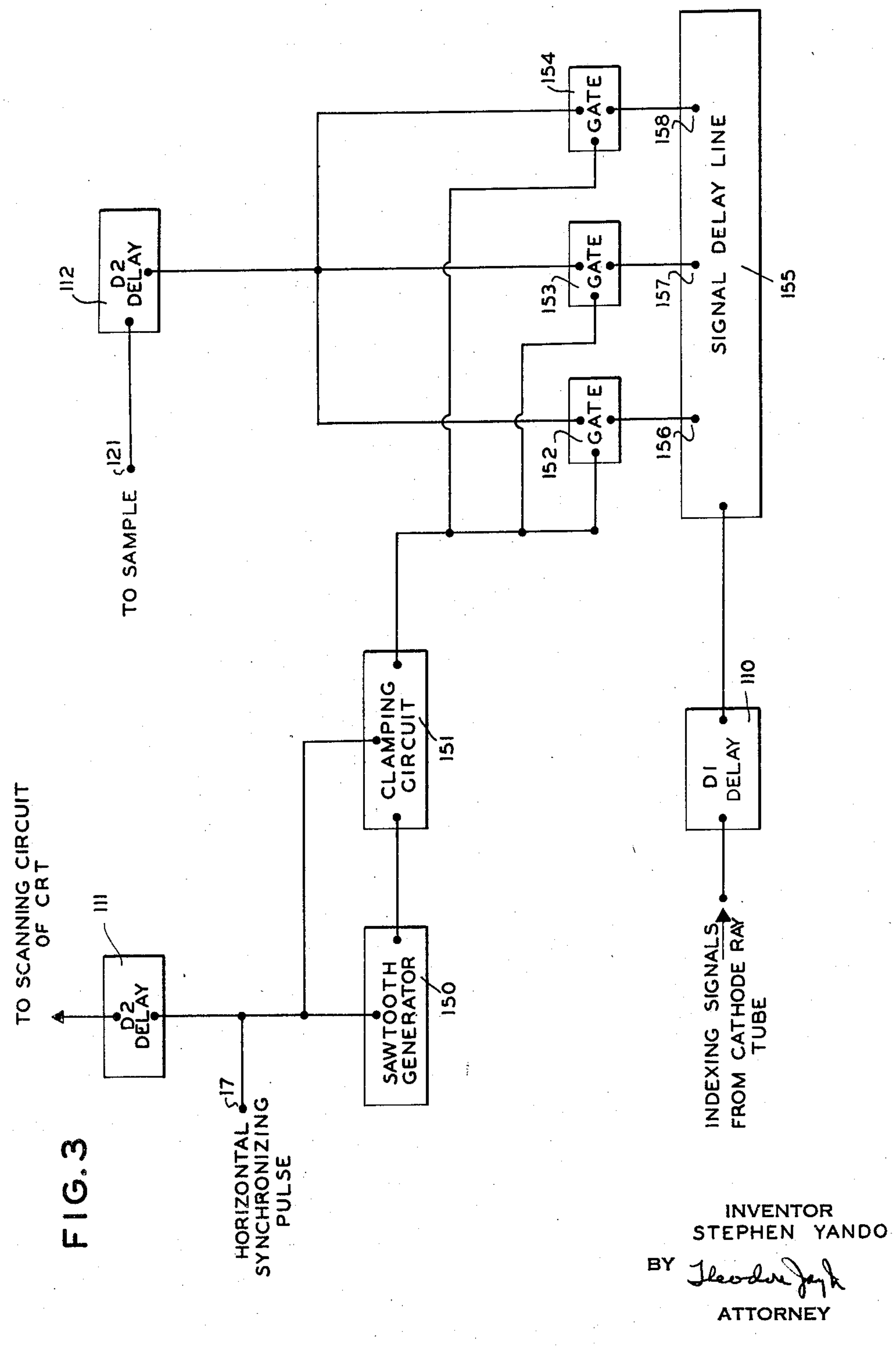
Fig. 3 is a diagram of a second type of variable time delay network and suitable for use in my invention.

Fig. 3 shows a second type of variable delay network. There is provided a sawtooth generator 150, a clamping circuit 151 coupled to the output of generator 150, and a plurality of gates, in this example, three gates 152, 153 and 154, having their conditioning electrodes coupled to the output of the clamping circuit. In addition, there is a signal delay line 155 provided with a plurality of taps in this example, taps 156, 157 and 158 connected to corresponding inputs of gates 152, 153 and 154. The outputs of all gates are coupled together to the input of D2 delay line 112. The output of delay line 112 is coupled to terminal 112.

The indexing signals are supplied through D1 delay line to the input of delay line 155.

The indexing signals are supplied to the input of delay line 155 and propagate therethrough at a fixed velocity. The electrical length of the line 155 is so selected that these signals cannot propagate all the way through the line in the time interval defined by the time separation between adjacent line synchronizing pulses, even though this interval varies in accordance with pulse jitter or position shifts. The position of the taps is so selected that the propagating signals must at least pass tap 156 in the same time interval. Stated differently, the time separation between adjacent synchronizing pulses can vary, but circuit considerations will establish certain maximum and minimum time separations which cannot be exceeded and the length of the delay line and the various tap positions will be determined in accordance with these extreme separations.

The purpose of this arrangement is to insure that, despite variations in the time separation between adjacent synchronization pulses, the indexing signals will leave the delay line 155 at an instant such that the scanning and sampling operations will remain in synchronism.

To this end, the sawtooth generator is actuated by each horizontal synchronizing pulse to produce an output voltage of sawtooth shape which linearly rises in value from 0 to a final value determined by the clamping circuit. As soon as the output voltage varies from 0 and a horizontal synchronizing pulse is supplied to this circuit, this clamping action is initiated. Each pulse resets the generator and returns the output voltage to zero. As a result, the value of the generator output voltage when clamped is proportional to the time separation between the synchronizing pulse which actuated the generator and the adjacent synchronizing pulse which actuates the clamping circuit and determines the final (non zero) value of the generator output voltage.

This clamped voltage controls the operations of the gates. Each gate is normally closed and opens only when the clamped voltage falls within predetermined maximum and minimum voltages.

Thus, if the taps are properly positioned, there will be a range of clamped output voltages which corresponds to any time separation between adjacent synchronizing pulses. Further, if the taps are properly positioned, the time required for the indexing pulses to propagate through the delay line 155 past any of these taps will be equal to a corresponding time separation. Then if the gate coupled to each tap is conditioned to open only when the clamped output voltage attains a value which is representative of the corresponding time separation, the device will function in the desired manner.

Obviously, the number of gates and taps required depends upon the requirements of the system in which they are used, and normally, more than three gates and taps would be used.

Figure 4:
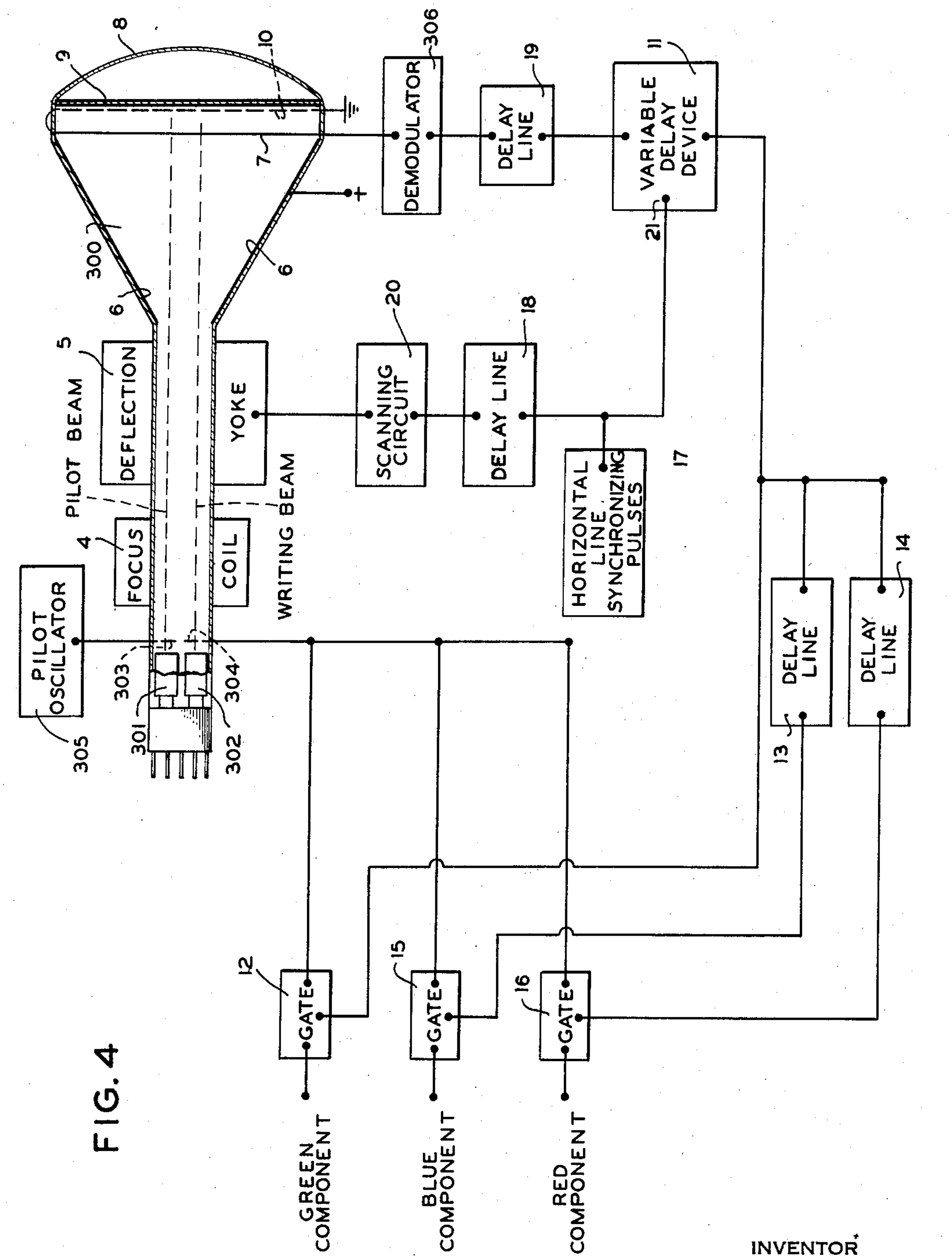
Fig. 4 illustrates a second embodiment of my invention.

Referring now to Fig. 4, a cathode ray tube identified at 300 is of the same general known type shown in Fig. 1. However, the tube is provided with two electron guns 301 and 302 which produce corresponding electron beams defined as a pilot beam and a writing beam. The writing beam is used to produce the desired color video display; the pilot beam is used to produce the indexing signal. Both beams are simultaneously deflected across the face of the tube and scan the same indexing stripes at the same time. Control grids 303 and 304 are used to control the intensities of the pilot beam and the writing beam respectively. The use of dual beams prevents undesirable video signal-indexing signal intermodulation and permits easier separation and detection of the indexing signal.

A pilot oscillator 305 is coupled to the grid 303 to modulate the pilot beam at an intensity which is insufficient to affect the video image displayed by the tube.

As a result, during any cathode ray tube scanning operation, a carrier wave at pilot oscillator frequency pulse modulated by the indexing signals is induced in the pick-off loop 7. The modulated wave thus induced is fed to demodulator 306 wherein the indexing signals are extracted from the modulated wave. The indexing signals are then fed to the variable time delay network 11 and operation proceeds thereafter in the same manner as in Fig. 1.

For the purposes of clarity, each element in the drawings other than the various delay lines and networks has been described as acting without delay. Obviously, no element acts instantaneously, and consequently each element, in addition to its primary circuit function, must act as a delay line, although the amount of delay is extremely small. Therefore, it will be understood that the various delay lines incorporate the delays of the associated elements as well as the delay of the lines themselves.

While I have shown and pointed out my invention as applied above, it will be apparent to those skilled in the art that many modifications can be made within the scope and sphere of my invention as defined in the claims which follow.

What is claimed is:

1. In combination with a source of three different primary color video components and a cathode ray tube adapted for color image display wherein an electron beam suitably controlled by a grid and a scanning circuit successively scans horizontally a plurality of vertical, parallel, laterally separated indexing stripes to produce secondary emission current indexing pulses, a delay line coupled at its input to said scanning circuit; a color sampler coupled at its output to said grid and when actuated being responsive to said three different components to sequentially sample each component, said sampler yielding said sampled components at its output; a variable time delay network coupled at its output to said sample means to supply said pulses to said network, said network being and responsive to said indexing pulses to retain the indexing pulses associated with any horizontal line as said line is scanned, said network when actuated releasing its retained pulses to said sampler to actuate same; and means to supply horizontal line synchronization pulses to the delay line input and to said network to initiate the line scanning operation and actuate said network, said line and said network having interrelated time delay characteristics at which the synchronization pulse associated with any one line must initiate the scanning operation in synchronization with the sampling operation controlled by the indexing pulses associated with the scanned line immediately preceding said any one line.

2. In combination with a source of three different primary color video components and a cathode ray tube adapted for color image display wherein an electron beam suitably controlled by a grid and a scanning circuit successively scans horizontally a plurality of vertical, parallel, laterally separated indexing stripes to produce secondary emission current indexing pulses, a first delay line coupled at its input to said scanning circuit; a second delay line coupled at its input to said tube and responsive to said pulses; a color sampler coupled at its output to said grid and when actuated being responsive to said three different components to sequentially sample each component, said sampler yielding said sampled components at its output; a variable time delay network coupled between said second delay line and said sampler; means to supply said indexing pulses to said network, said network being responsive to said indexing pulses to retain the indexing pulses associated with any horizontal line as said line is scanned, said network when actuated releasing its stored pulses to said sampler to actuate same; and means to supply horizontal line synchronization pulses to the first delay line input and to said network to initiate the line scanning operation and actuate said network, said first line, said second line; and said network having selected electrical delay characteristics at which the synchronization pulse associated with any one line initiates the scanning operation in synchronization with the sampling operation controlled by the indexing pulses associated with the scanned line immediately preceding said any one one line.

3. In combination with a source of three different primary color video components and a cathode ray tube adapted for color image display wherein an electron beam suitably controlled by a grid and a scanning circuit successively scans horizontally a plurality of vertical, parallel, laterally separated indexing stripes to produce secondary emission current pulses at an indexing recurrence frequency, a pilot oscillator coupled to said grid to modulate said beam at a constant pilot frequency whereby in said tube said pulses are modulated on a carrier; a demodulator; means to supply said modulated pulses to said demodulator whereby said demodulator extracts the pulses from said modulated carrier; a fixed delay line coupled at its input to said scanning circuits; a color sampler coupled at its output to said grid and when actuated being responsive to said three different components to sequentially sample each component, said sampler yielding said sampled components at its output; a variable time delay network coupled between said demodulator and said sampler, said network being responsive to said indexing pulses to retain the indexing pulses associated with any horizontal line as said line is scanned, said network when actuated releasing its retained pulses to said sampler to actuate same; and means to supply horizontal line synchronization pulses to the delay line input and to said network to initiate the line scanning operation and actuate said network, said line and said network having time delay characteristics at which the synchronization pulse associated with any one line initiates the scanning operation in synchronization with the sampling operation controlled by the indexing pulses associated with the scanned line immediately preceding said any one line.

4. In combination with a source of three different primary color video components and a cathode ray tube adapted for color image display wherein first and second electron beams suitably controlled in synchronism through corresponding first and second grids and a common deflection circuit successively scan horizontally a plurality of vertical, parallel, laterally separated indexing stripes to produce secondary emission current pulses at an indexing recurrence frequency, a pilot oscillator coupled to said first grid to modulate said first beam at a constant pilot frequency whereby in said tube said pulses are modulated on a carrier at pilot frequency to produce a first pulse bearing carrier; a demodulator; means to supply said modulated pulses to said demodulator whereby said demodulator extracts the pulses from said modulated carrier, a fixed delay line coupled at its input to said scanning circuits; a color sampler coupled at its output to said second grid and when actuated being responsive to said three different components to sequentially sample each component, said sampler yielding said sampled components at its output; a variable time delay network coupled between said demodulator and said sampler, said network being responsive to said indexing pulses to retain the indexing pulses associated with any horizontal line as said line is scanned, said network when actuated releasing its retained pulses to said sampler to actuate same; and means to supply horizontal line synchronization pulses to the delay line input and to said network to initiate the line scanning operation and actuate said network, said line and said network having time delay characteristics at which the synchronization pulse associated with any one line initiates the scanning operation in synchronization with the sampling operation controlled by the indexing pulses associated with the scanned line immediately preceding said any one line.

References Cited in the file of this patent

UNITED STATES PATENTS

| | | |
|---|---|---|
| 2,651,760 | Lalande | Sept. 8, 1953 |
| 2,685,047 | Moore | July 27, 1954 |
| 2,713,605 | Bradley | July 19, 1955 |
| 2,725,421 | Valdes | Nov. 29, 1955 |
| 2,732,493 | Baker | Jan. 24, 1956 |
| 2,736,764 | Bingley | Feb. 28, 1956 |
| 2,831,052 | Boothroyd | Apr. 15, 1958 |